March 31, 1931. F. W. SPERR, JR 1,798,912
TREATMENT OF GAS PURIFICATION PRODUCTS
Filed Oct. 7, 1926
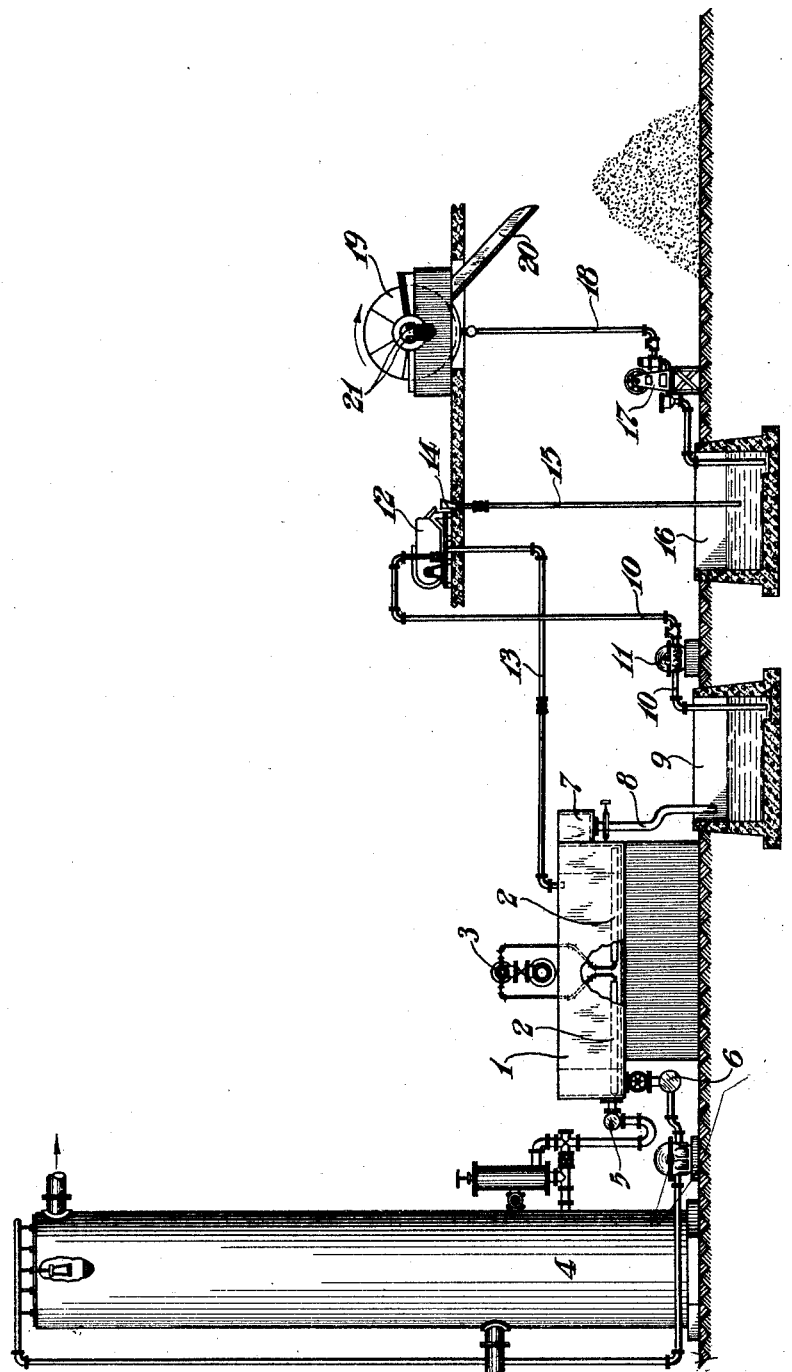
INVENTOR
*Frederick W. Sperr Jr.*
BY
*Jesse R. Langley*
ATTORNEY Patented Mar. 31, 1931

1,798,912

UNITED STATES PATENT OFFICE

FREDERICK W. SPERR, JR., OF PITTSBURGH, PENNSYLVANIA, ASSIGNOR TO THE KOPPERS COMPANY, A CORPORATION OF PENNSYLVANIA

TREATMENT OF GAS-PURIFICATION PRODUCTS

Application filed October 7, 1926. Serial No. 140,053.

My invention relates to the treatment of sulphur slurries, froths or foams produced in the aeration and/or regeneration of liquids containing soluble sulphides or hydrosulphides and more particularly fouled alkaline gas purification liquids.

An object of my invention is to recover sulphur from such slurries in an improved state of purity.

A second object of my invention is to recover from such slurries mineral constituents that may be utilized in reactions incident to gas purification, and which are entrained in such slurries when they are separated from gas purification solutions.

My invention has for further objects such other improvements in operative advantages and results as may hereinafter be found to obtain.

In general, the gas purification processes which are intended to prevent emission of hydrogen sulphide into the atmosphere involve treatment of gas with an alkaline solution containing iron oxide, nickel sulphide or other compound capable of catalytically or stoicheiometrically promoting the oxidation of dissolved sulphides or hydro-sulphides to free sulphur under the influence of aeration. The separation of sulphur from the gas purification liquid has been made practical by aerating the latter with air in a very finely comminuted state. In this manner, a flotation of the sulphur is effected and its easy removal is assured. This flotation of the sulphur, however, causes the entrainment in the froth or slurry of a substantial amount of iron or other metallic compound required by the gas purification system.

Previous investigations have proven that it is difficult to recover this valuable material from the sulphur slurry. The object of treating the slurry is two-fold—first, to recover sulphur of high purity, and, second, to recover insoluble materials of the character indicated in order that they may be returned to the gas purification system.

In accordance with my invention, I subject the slurry to a secondary flotation operation for the purpose of concentrating sulphur and removing entrained mineral matter therefrom, and I subsequently filter the sulphur concentrate to recover sulphur therefrom in a relatively dry and pure state.

In order that my invention may be clearly set forth and understood, I now describe, with reference to the accompanying drawing, the preferred form and manner in which my invention is embodied and practiced.

The single figure shows a more or less diagrammatic view, in elevation, of apparatus for purifying gas, regenerating the gas purification liquid and for treating the slurry removed therefrom.

The apparatus for effecting regeneration of fouled gas purification liquid is known as a thionizer. This is comprised of a rectangular tank 1 that is provided with suitable baffles and partitions for separating it into a number of compartments. Near the bottom of each compartment are situated one or more aerators 2 that are supplied with compressed air from a conduit 3 and which serve to introduce this air in very finely comminuted form into liquid maintained in the tank 1.

Alkaline liquid fouled by contact with the gas being purified is introduced to the thionizer from an absorption tower 4 through a manifold conduit 5, and, after aeration, is withdrawn in regenerated state through a conduit 6, for further use. The froth liberated in the course of aeration accumulates on the surface of the liquid being aerated and overflows into a launder 7, from which it is withdrawn through a conduit 8, into a sump 9.

For the re-flotation of the slurry accumulated in the sump 9, I have used a flotation machine of the type shown and described in U. S. patents to Kollberg and Kraut, Nos. 1,261,556 of April 2, 1918 and 1,319,667, of Oct. 21, 1919, but other types of flotation machines may be used. The slurry is pumped from the sump 9 through a conduit 10 by means of a pump 11 into a flotation machine 12, where it is subjected to violent agitation and aeration.

In the course of this treatment, the sulphur is caused to float in the form of a froth and the iron oxide, or other mineral matter, is rejected in the form of tailings which are returned to the thionizer 1 through a conduit 13. The sulphur froth concentrate overflows into a trough 14 and drains through a conduit 15 into a concentrate sump 16.

For filtering the concentrate, I prefer to use a continuous filter of any of the well-known types, but any type of filtering apparatus—for example, a plate-and-frame press—may be used. Concentrate is drawn from the sump 16 by means of a diaphragm pump 17, or other suitable device, and forced through a conduit 18 into a continuous vacuum filter 19. The sulphur cake deposited upon the leaves of the filter 19 is washed and dried and then scraped off to fall through a chute 20 into whatever storage space is provided for it, while the filtrate and the wash water are withdrawn through conduits 21, which may be connected to properly equipped receivers and to vacuum pumps, according to the requirements of the filtering device.

Actual experiments with my apparatus have shown that a recovery of 90% of the sulphur and 80% of the iron, or other compound is attainable. The filtered sulphur is of high purity, is easily pressed and burns readily, while the capacity of the filter, as compared to a system in which the slurry is filtered without flotation, is greatly increased.

An advantage of my process resides in the fact that the re-flotation of the sulphur from the slurry takes place in an alkaline medium which I have found to be beneficial, and coincident with this is the fact that the alkali withdrawn in the slurry is returned to the gas purification system.

According to my invention, substantially all of the iron or other metallic compound formerly lost by entrainment in the slurry is returned to the gas purification system and the total consumption of this material is correspondingly reduced. Furthermore, tests have shown that the iron compound recovered and returned to the gas purification system in the form of tailings from the re-flotation operation is in exceptionally active form and greatly improved the efficiency of regeneration.

Finally my invention makes possible the purification of sulphur by the use of simple and convenient apparatus working at normal pressure and temperature and without the use of solvents.

While I have described my invention with reference to a particular form and embodiment, it is not limited to such illustrative example but may be variously embodied within the scope of the following claims.

I claim as my invention:

1. The process of treating slurry produced in the aeration of gas purification liquid which comprises submitting such slurry to a flotation operation, removing sulphur therefrom in the form of froth concentrate and removing metallic compounds in the tailings therefrom.

2. The process of treating slurry produced in the aeration of gas purification liquid which comprises subjecting it to a flotation operation, removing sulphur therefrom in the form of froth concentrate and filtering said concentrate to recover sulphur therefrom, removing metallic compounds in the tailings from the flotation and returning said tailings for further use in gas purification.

3. The process of treating slurry containing elemental sulphur and a metallic compound which comprises submitting the slurry to a flotation operation and separating sulphur therefrom as froth concentrate.

4. The process of treating slurry produced in the aeration of liquid containing dissolved sulphides or hydrosulphides which comprises causing a flotation of sulphur from said slurry and returning the tailings therefrom to the gas purification system.

5. In the treatment of sulphur slurries, the step which comprises effecting a re-flotation of sulphur from the remainder of said slurry, in the presence of an alkali.

6. The process of regenerating fouled alkaline liquid containing dissolved sulphides and a compound of a metal useful in promoting the oxidation of said sulphides, which comprises aerating the solution with finely comminuted air to oxidize said sulphides to free sulphur and to cause a flotation thereof, removing said sulphur as slurry, subjecting said slurry to a re-flotation operation, removing sulphur therefrom as concentrate, and returning the tailings therefrom to the said alkaline liquid.

7. In combination, an aeration chamber provided with foraminous aerators and a launder for removing froth, a flotation machine, means for conducting the froth to the flotation machine, means for removing concentrate, and means for returning tailings to said aeration chamber.

8. Apparatus for recovering sulphur from a gas containing a sulphur impurity which comprises an absorber in the path of the flowing gas, an aeration and flotation device, means for continuously recirculating an absorbent liquid through a cycle comprising said absorber and said device, a flotation device located separately from and independent of the cycle of recirculation of the absorbent liquid, and means for conveying sulphur froth slurry from said aeration and flotation device to said separately located flotation device for re-flotation.

9. Apparatus for recovering sulphur from a gas containing a sulphur impurity which comprises an absorber in the path of the flowing gas, an aeration and flotation device, means for continuously recirculating an absorbent liquid through a cycle comprising said absorber and said device, a flotation device located separately from and independent of the cycle of recirculation of the absorbent liquid, means for conveying sulphur froth slurry from said aeration and flotation device to said separately located flotation device for reflotation, means for removing froth and tailings therefrom, and means for returning tailings to said recirculating absorbent liquid.

10. Apparatus for recovering sulphur from a gas containing a sulphur impurity which comprises an absorber in the path of the flowing gas, a pneumatic flotation device, means for continuously recirculating an absorbent liquid through a cycle comprising said absorber and said pneumatic flotation device, a mechanical flotation device located separately from and independent of the cycle of recirculation of the absorbent liquid, and means for conveying sulphur froth slurry from said pneumatic flotation device to said mechanical flotation device for re-flotation.

In testimony whereof, I have hereunto subscribed my name this 27th day of September, 1926.

FREDERICK W. SPERR, Jr.